United States Patent Office 3,073,662
Patented Jan. 15, 1963

3,073,662
PROCESS FOR THE PRODUCTION OF FAST DYEINGS ON POLYHYDROXYLATED MATERIALS
Peter Jaeger and Eugen Johann Koller, Binningen, Jacques Wegmann, Basel, and Heinrich Zollinger, Binningen, Switzerland, assignors to Ciba Limited, Basel, Switzerland
No Drawing. Filed Aug. 25, 1958, Ser. No. 757,146
Claims priority, application Switzerland Sept. 4, 1957
7 Claims. (Cl. 8—54.2)

This invention relates to a process for the production of fast dyeings on polyhydroxylated materials.

The invention is based on the observation that fast dyeings are obtained on polyhydroxylated materials, such as polyvinyl alcohol or cellulose textile materials, when these materials are dyed with dyestuffs containing at least one water-solubilizing group and at least one reactive amino group, the textile material being treated during or after the dyeing operation with a poly-epoxide or a compound convertible under the conditions of the process into such a compound, and the material impregnated with dyestuff and the poly-epoxide being subjected to a heat treatment. As acid water-solubilizing groups may be mentioned, for example, carboxyl groups, sulfonamide groups and more especially sulfonic acid groups.

As dyestuffs to be used in the process may be mentioned: anthraquinone dyestuffs, triphenylmethane dyestuffs, oxazine dyestuffs, nitro dyestuffs, perinone dyestuffs, phthalocyanine dyestuffs and more especially azo-dyestuffs, both metal-free dyestuffs and also their metal complexes being concerned, for example copper, nickel, chromium or cobalt complexes. These dyestuffs must contain at least one amino group capable of reacting with the epoxy compound, for example a primary or secondary aromatically or aliphatically combined amino group or an amino group attached to an acid radical, especially a sulfonic acid radical.

As poly-epoxides (i.e. compounds containing at least two epoxy groups) to be used in the process there may be mentioned especially the di-epoxides, of which the simplest representative is butadiene dioxide of the formula:

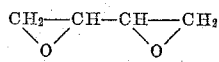

Further suitable di-epoxides are constituted by the diglycidyl ethers of the formula:

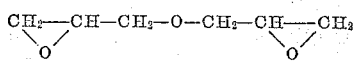

and those of the formula:

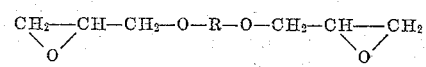

in which R indicates an organic radical.

As examples of compounds corresponding to the above formula may be mentioned the diglycidyl ethers of ethylene glycol, propylene glycol, trimethylene glycol, 1:4-butane-diol, 1:3-butane-diol, 2:3-butane-diol, 1:5-pentane-diol, 2:4-pentane-diol, 1:6-hexane-diol, 2:5-hexane-diol and 2-methyl-2:4-pentane-diol. Not only the already mentioned water-soluble poly-epoxides but also water-insoluble epoxides can be used according to the present process if they are employed in the emulsified condition. As examples of water-insoluble poly-epoxides may be mentioned the diglycidyl ethers of 1:4-dihydroxy-benzene, 4:4'-dihydroxy-diphenyl ether and more especially of 4:4'-dihydroxy-diphenyl-dimethyl propane. The diglycidyl ester of phthalic acid may also be mentioned. Instead of di-epoxides compounds can also be used that are converted under the conditions of the process into di-epoxides, for example 2:3-dibromo-butane-diol-(1:4).

It has proved to be very advantageous to add to the dye bath bases, for example alkali metal hydroxides, ammonia or water-soluble aliphatic amines or alkali salts of weak acids, for example sodium carbonate or sodium acetate.

The di-epoxide can be applied to the fiber either during or after the dyeing operation. In the first case, the di-epoxide is simply added to the aqueous solution of the dyestuff concerned, preferably together with a base. In the process of the invention the goods to be dyed are preferably dyed with such solutions in the cold or at only moderately elevated temperatures. During the dyeing process, the epoxy groups react with the amino groups of the dyestuffs and/or probably with the hydroxyl groups of the polyhydroxylated material. This reaction is accelerated by the presence of the above-mentioned bases or alkali salts of weak acids. An advantageous embodiment of the present process consists in that the goods to be dyed are dyed on the foulard and squeezed off in the usual way, advantageously so that the impregnated goods retain 0.5 to 1.3 times their original weight of dyestuff solution. When the di-epoxide is not contained in the dye bath, the dyed goods, if desired after intermediate drying, must be subsequently impregnated with an aqueous solution or emulsion of the di-epoxide. This liquor can likewise contain a base, advantageously, if no base was present in the dye bath, or it can be diluted with a suitable organic liquid.

The fixing of the dyestuffs on the goods impregnated in this manner with dyestuffs and di-epoxide, takes place, if desired after previous drying, by heating thereof to temperatures above 100° C., advantageously to about 140° C. In this heat treatment there is obviously produced a stable chemical combination between the dyestuff, the di-epoxide and the fiber. The resulting dyeings are therefore of excellent fastness to washing.

In some cases it may be of advantage to subject dyeings obtainable according to the present process to an after-treatment. Thus the resulting dyeings are advantageously soaped; by this after-treatment any dyestuff not completely fixed is removed.

The following examples illustrate the invention, the parts and percentages being by weight:

Example 1

A piece of cotton fabric was saturated at room temperature in an aqueous solution containing in 100 parts 4.3 parts of the dyestuff obtained by alkaline coupling of diazotized 1-aminobenzene-2-sulfonic acid with 2-amino-5-hydroxynaphthalene-7-sulfonic acid, and also 2 parts of sodium hydroxide solution and 18 parts of butadiene dioxide. The goods were squeezed off and after drying at 80° C. fixed for 10 minutes at 140° C.

They were then rinsed and soaped at the boil, after which the dyestuff remained on the fiber.

When the dyeing operation is carried out without butadiene dioxide there is no fixation and in the soaping the dyestuff is completely removed again from the fiber.

Example 2

A cotton fabric was impregnated with a dilute aqueous solution of an alkali metal hydroxide or carbonate and the azo dyestuff described in Example 1 and dried. It was then treated at ordinary temperature in a second bath containing an aqueous butadiene dioxide solution and left to react for 10 minutes in an air bath at 130° C. The majority of the dyestuff thereby became fixed on the fiber fast to soaping and boiling.

Example 3

Example 2 was repeated without adding a catalyst in the form of the alkali metal compound specified. By this treatment also a dyeing was produced which after soaping was fast to washing.

Example 4

A cotton fabric was treated on the foulard with an aqueous solution, containing 5% of butadiene dioxide, of the dyestuff mentioned in Example 1, and after drying passed through a bath containing 3% of concentrated sodium hydroxide solution and 30% of common salt. Then fixing was carried out for 5 minutes at 140° C. On soaping only a small quantity of dyestuff was removed from the fiber.

Example 5

Instead of the dyestuff used in Example 1, the following dyestuffs were employed, all of which could be fixed on the fiber fast to washing and boiling with the aid of butadiene dioxide:

(a) Yellow azo dyestuff from diazotized 2-aminonaphthalene-4:8-disulfonic acid→m-toluidine.
(b) Red-brown azo dyestuff from diazotized aniline disulfonic acid→2-hydroxy-3-naphthoic acid-(p-aminoanilide).
(c) Black disazo-dyestuff of the constitution

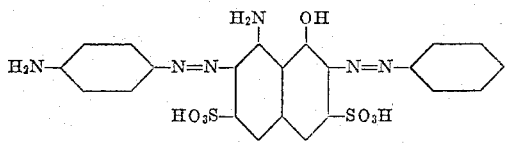

prepared by acid coupling of diazotized p-nitraniline with 1-amino-8-hydroxynaphthalene-3:6-disulfonic acid, then by alkaline coupling with diazotized aniline and reduction of the nitro group.
(d) Blue dyestuff of the formula:

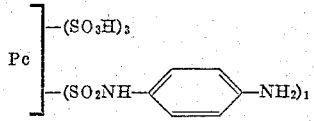

in which Pc indicates a copper phthalocyanine residue, obtainable by reaction of copper phthalocyanine-3:3′:3″:3‴-tetrasulfochloride with 4-aminoformylanilide or 4-aminoacetanilide and subsequent alkaline hydrolysis.
(e) Blue dyestuff of the formula

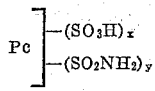

in which $x+y=4$ and Pc has the same meaning as above, prepared by the action of ammonia on copper phthalocyanine tetrasulfochloride in aqueous solution.
(f) Blue dyestuff of the formula

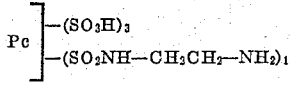

in which Pc has the meaning given above.
(g) Blue dyestuff of the formula

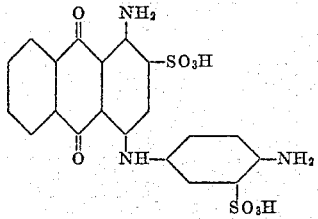

(h) Orange-red dyestuff containing 2 mols of the monoazo dyestuff obtained by coupling diazotized 1-hydroxy-2-aminobenzene-4-sulfonamide with 1-(p-chlorophenyl)-3-methyl-pyrazolone-5, in complex combination with 1 atom of chromium.

Example 6

4 parts of 2:2-di-(p-hydroxy-phenyl)-propane diglycide ether are emulsified in 20 parts of water with the aid of a suitable emulsifier and treated with 0.5 part of a dyestuff obtained by reaction of copper phthalocyanine tetrasulfochloride with aqueous ammonia, and also 3 parts of concentrated sodium hydroxide solution. A cellulose fabric was treated with this emulsion and dried and hardened for 15 minutes at 130° C. The dyestuff was fixed on the fiber by this treatment.

Example 7

2 parts of 2:3-dibromobutane-diol-(1:4) and 0.3 part of the azo dyestuff described in Example 1 are dissolved in 8 parts of water and treated with 2.5 parts of concentrated sodium hydroxide solution. A piece of cotton fabric was saturated with this preparation and heated for 15 minutes at 140° C. By this treatment the dyestuff was fixed on the fiber to a high degree fast to soap and boiling.

Example 8

5 parts of ethylene glycol diglycide ether and 0.7 part of the dyestuff described in Example 1 are dissolved in 18 parts of water and treated with 1 part of concentrated sodium hydroxide solution. Cotton fabric was impregnated with the solution and hardened at 130° C. As a result of this treatment only a small fraction of the dyestuff could be removed from the fiber.

What is claimed is:

1. A process for the production of fast dyeings, which comprises dyeing cotton with a dyestuff having in its molecule one to three water-solubilizing groups and an acylatable NH$_2$ group, treating the cotton prior to the fixation of the dyestuff on the fiber with a compound having in its molecule a member selected from the group consisting of di-epoxy and bis-(di-hydroxy) convertible to di-epoxy, groups, and subjecting the cotton impregnated with the dye-stuff and the epoxy compound to a heat treatment between 100 and 180° C.

2. A process for the production of fast dyeings, which comprises dyeing cotton in a dye bath having in solution therein a dyestuff having in its molecule one to three water-solubilizing groups and an acylatable NH$_2$ group and a compound having in its molecule two epoxy groups, prior to the fixation of the dyestuff on the fiber, and subjecting the cotton impregnated with the dyestuff and the epoxy compound to a heat treatment between 100 and 180° C.

3. A process for the production of fast dyeings on cotton which comprises impregnating cotton with an aqueous dyeing liquor having in solution therein a dyestuff having in its molecule one to three sulfonic acid groups and an acylatable NH$_2$ group, and butane diepoxide, prior to the fixation of the dyestuff on the fiber, and subjecting the impregnated cotton to a heat treatment at 100–180° C.

4. A process for the production of fast dyeings on cotton which comprises impregnating cotton with an aqueous dyeing liquor having in solution therein a dyestuff having in its molecule one to three water-solubilizing groups and an acylatable NH$_2$ group, butane di-epoxide, and an alkaline reacting compound, prior to the fixation of the dyestuff on the fiber, and subjecting the impregnated cotton to a heat treatment at 120–160° C.

5. A process for the production of fast dyeings on cotton which comprises impregnating cotton with an aqueous dyeing liquid having in solution therein a phthalocyanine dyestuff having in its molecule two to three sulfonic acid groups and an acylatable NH$_2$ group, butadiene dioxide, and an alkali hydroxide, prior to the fixation of the dyestuff on the fiber, and subjecting the impregnated cotton to a heat treatment at 120–160° C.

6. A process for the production of fast dyeings on cotton which comprises impregnating cotton with an aqueous dyeing liquor having in solution therein a phthalocyanine dyestuff of the formula

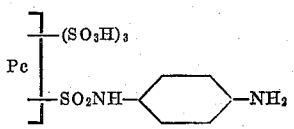

wherein Pc is copper phthalocyaninyl, butadiene dioxide, and an alkali hydroxide, prior to the fixation of the dyestuff on the fiber, and subjecting the impregnated material to a heat treatment at 120–160° C.

7. A process for the production of fast dyeings on cotton which comprises impregnating cotton with an aqueous dyeing liquor having in solution therein a dyestuff having in its molecule one to three water-solubilizing groups and an acylatable $NH_2$ group and then with an aqueous solution of butadiene dioxide and an alkaline reacting compound, prior to the fixation of the dyestuff on the fiber, and subjecting the impregnated cotton to a heat treatment at 120–160° C.

References Cited in the file of this patent

UNITED STATES PATENTS

| | | |
|---|---|---|
| 1,981,295 | Weinand | Nov. 20, 1934 |
| 2,252,039 | Schirm | Aug. 12, 1941 |
| 2,455,083 | Musser | Nov. 30, 1948 |
| 2,723,924 | Mackinney | Nov. 15, 1955 |
| 2,730,427 | Suen | Jan. 10, 1956 |
| 2,741,531 | Pedersen | Apr. 10, 1956 |
| 2,741,532 | Guthrie | Apr. 10, 1956 |
| 2,752,269 | Condo et al. | June 26, 1956 |
| 2,761,868 | Lacey | Sept. 4, 1956 |
| 2,774,691 | Schroeder et al. | Dec. 18, 1956 |
| 2,785,158 | Enders et al. | Mar. 12, 1957 |
| 2,829,071 | Schroeder | Apr. 1, 1958 |
| 2,869,971 | Coe | Jan. 20, 1959 |
| 2,903,442 | Riat | Sept. 8, 1959 |
| 2,906,748 | Riat | Sept. 29, 1959 |